United States Patent
Feldner et al.

(10) Patent No.: US 11,749,934 B2
(45) Date of Patent: Sep. 5, 2023

(54) PLUG CONNECTOR PART HAVING A CONNECTOR PART TO BE CONNECTED TO A HOUSING PART

(71) Applicant: PHOENIX CONTACT E-Mobility GmbH, Schieder-Schwalenberg (DE)

(72) Inventors: Ralf Feldner, Horn-Bad Meinberg (DE); Carsten Garth, Lemgo (DE); Cedric Deppe, Doerentrup (DE); Tanja Gebhardt, Schlangen (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 17/421,401

(22) PCT Filed: Dec. 16, 2019

(86) PCT No.: PCT/EP2019/085344
§ 371 (c)(1),
(2) Date: Jul. 8, 2021

(87) PCT Pub. No.: WO2020/144005
PCT Pub. Date: Jul. 16, 2020

(65) Prior Publication Data
US 2022/0102904 A1    Mar. 31, 2022

(30) Foreign Application Priority Data

Jan. 11, 2019  (BE) .................................. 2019/5016

(51) Int. Cl.
*H01R 13/516*  (2006.01)
*B60L 53/16*  (2019.01)
*H01R 13/506*  (2006.01)

(52) U.S. Cl.
CPC ............ *H01R 13/516* (2013.01); *B60L 53/16* (2019.02); *H01R 13/506* (2013.01); *H01R 2201/26* (2013.01)

(58) Field of Classification Search
CPC ................ H01R 13/506; H01R 13/516; H01R 13/5213; H01R 13/625; B60L 53/16
See application file for complete search history.

(56) References Cited

U.S. PATENT DOCUMENTS

| 10,256,565 B2 | 4/2019 | Kraemer et al. |
| 2013/0049972 A1 | 2/2013 | Kwasny et al. |

(Continued)

FOREIGN PATENT DOCUMENTS

| CN | 104659570 A | 5/2015 |
| CN | 104682074 A | 6/2015 |

(Continued)

OTHER PUBLICATIONS

Translation of Description WO 2018/091422. Plug-Connector Part, in Particular for Transferring a Charging Current To Charge an Electric Vehicle. May 24, 2018. (Year: 2018).*

*Primary Examiner* — Edwin A. Leon
(74) *Attorney, Agent, or Firm* — LEYDIG, VOIT & MAYER LTD.

(57) ABSTRACT

A plug connector part for connecting to a mating plug connector part includes: a housing part; a connector part that is to be locked to the housing part and has a plug section on which at least one contact element is arranged for a plug connection to the mating plug connector part; a cover element that is to be connected to the connector part and has at least one line outlet for receiving an electrical line connected to the connector part; and a frame part, which is to be connected in a latching manner to the connector part (Continued)

and is formed to fasten the cover element to the connector part when the frame part is placed on the connector part.

13 Claims, 6 Drawing Sheets

(56) References Cited

U.S. PATENT DOCUMENTS

| | | |
|---|---|---|
| 2015/0147919 A1 | 5/2015 | Seelig et al. |
| 2015/0224887 A1 | 8/2015 | Toth |

FOREIGN PATENT DOCUMENTS

| | | |
|---|---|---|
| CN | 206498000 U | 9/2017 |
| CN | 107230860 A | 10/2017 |
| DE | 102012214754 A1 | 2/2013 |
| DE | 102012019605 A1 | 4/2014 |
| DE | 102014215077 A1 | 2/2016 |
| EP | 1049211 A2 | 11/2000 |
| EP | 2908385 A1 | 8/2015 |
| EP | 2955796 A1 | 12/2015 |
| TW | 201117489 A | 5/2011 |
| WO | WO 2018091422 A1 | 5/2018 |

\* cited by examiner

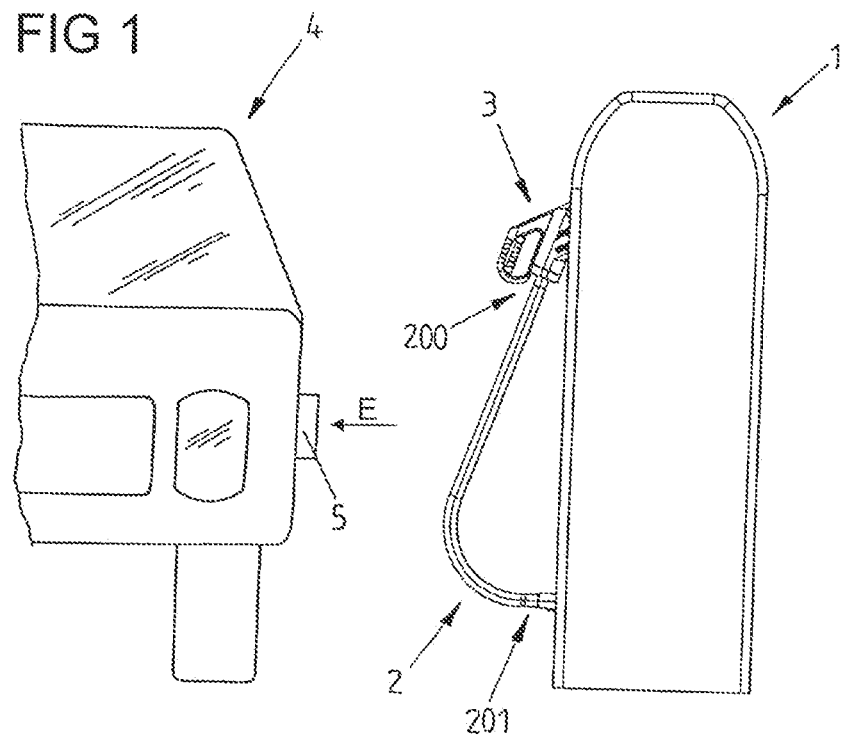
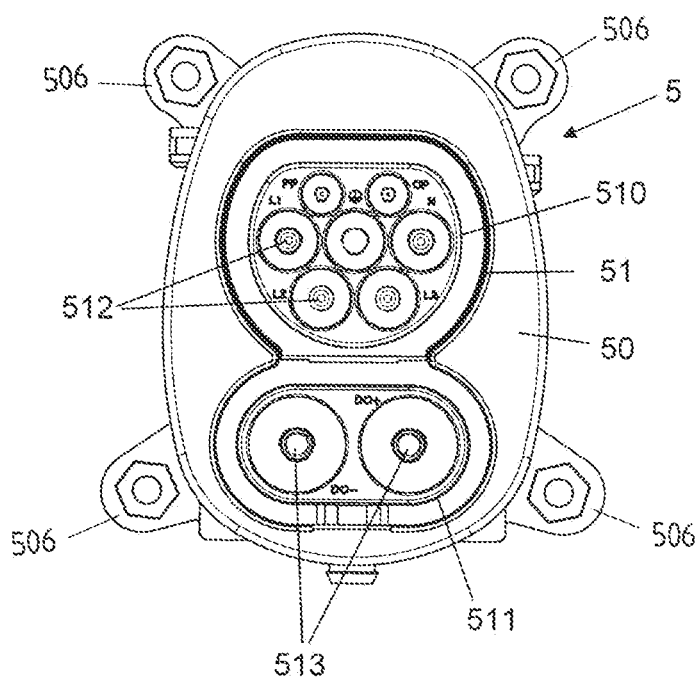

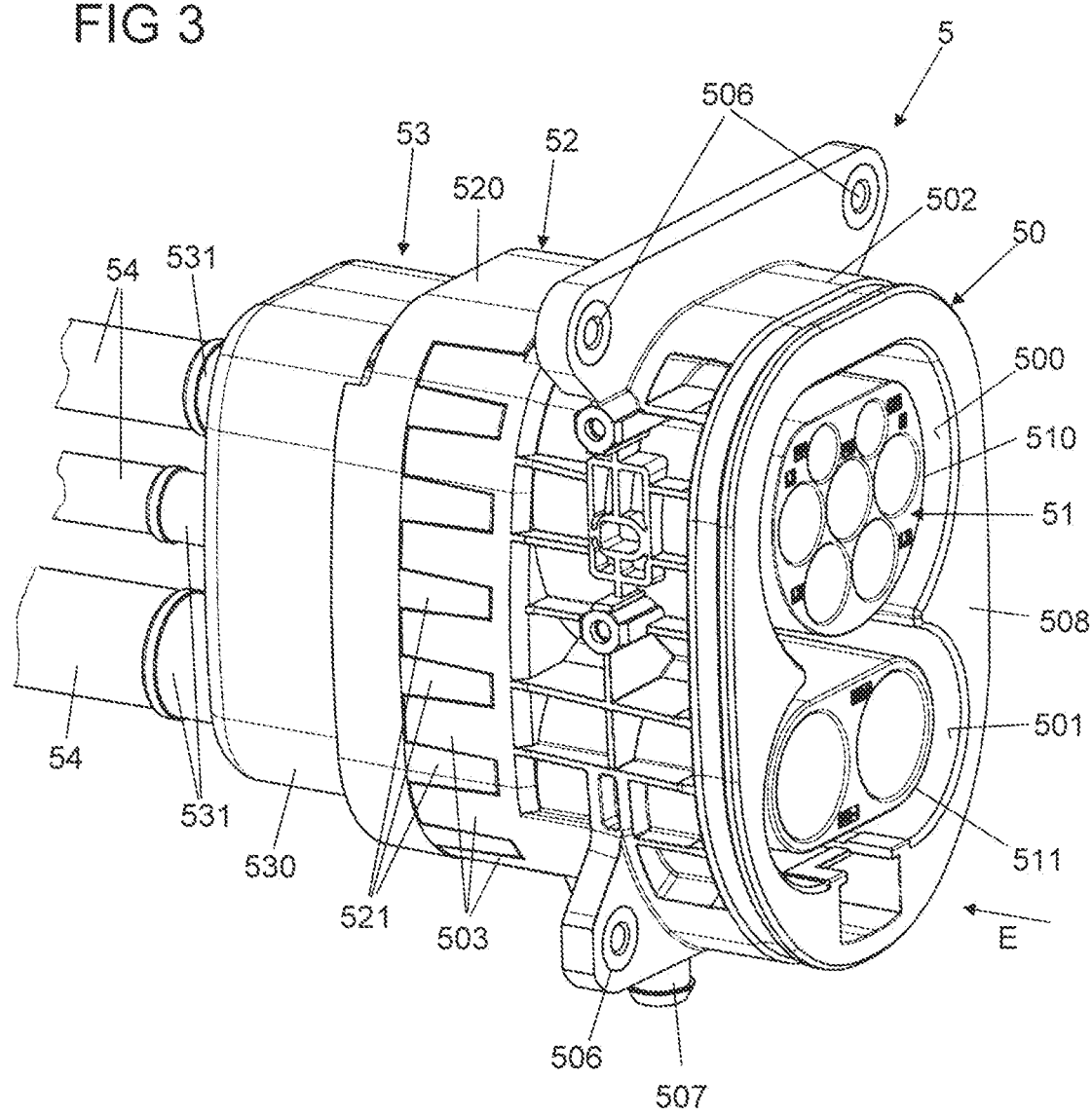

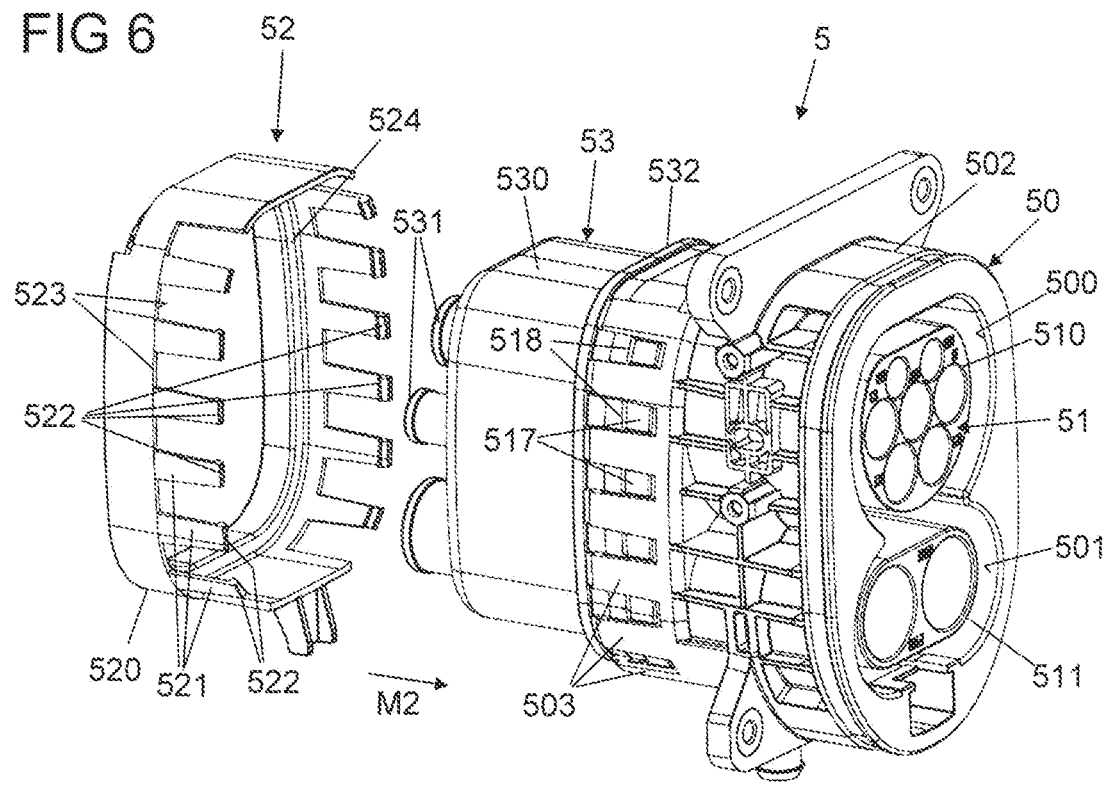
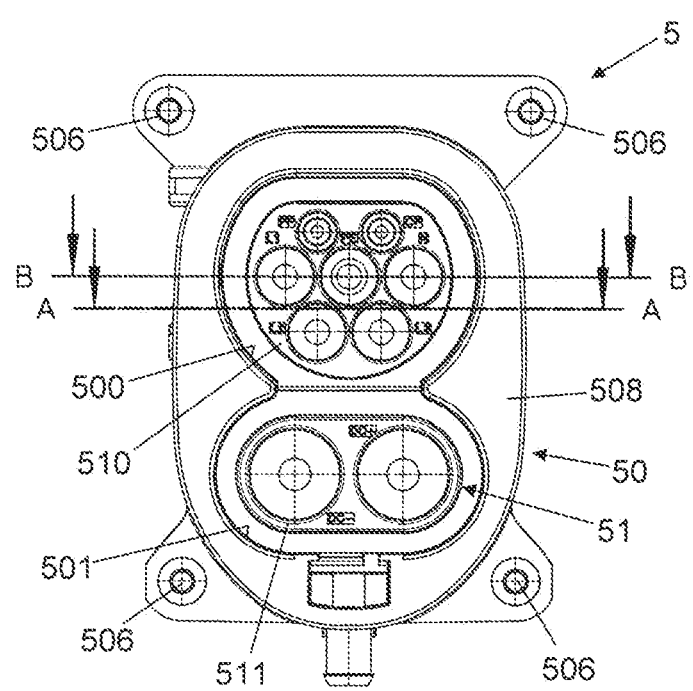

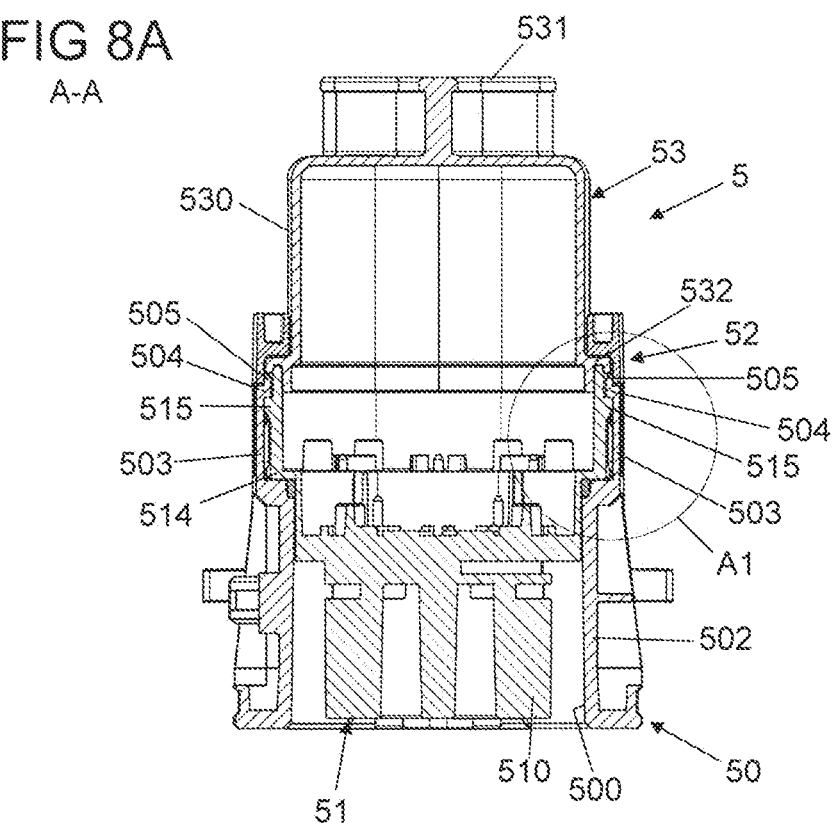
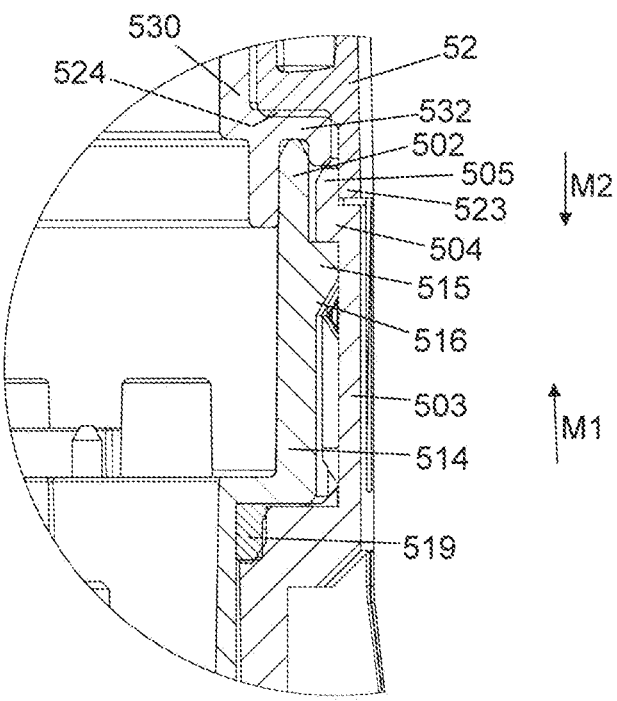

B-B

PLUG CONNECTOR PART HAVING A CONNECTOR PART TO BE CONNECTED TO A HOUSING PART

CROSS-REFERENCE TO PRIOR APPLICATIONS

This application is a U.S. National Phase application under 35 U.S.C. § 371 of International Application No. PCT/EP2019/085344, filed on Dec. 16, 2019, and claims benefit to Belgian Patent Application No. BE 2019/5016, filed on Jan. 11, 2019. The International Application was published in German on Jul. 16, 2020 as WO 2020/144005 under PCT Article 21(2).

FIELD

The invention relates to a plug connector part for connecting to a mating plug connector part and to a method for mounting a plug connector part.

BACKGROUND

Such a plug connector part comprises a housing part and a connector part that is to be locked to the housing part, which connector part has a plug section on which at least one (electrical) contact element is arranged for a plug connection to the mating plug connector part. A cover element is to be connected to the connector part and has at least one line outlet for receiving an electrical line connected to the connector part.

Such a plug connector part can be used, for example, as a charging socket for charging an electrically driven vehicle (also referred to as an electric vehicle). Such a charging socket is arranged, for example, on a vehicle and can be connected in a plug-in manner to an associated mating plug connector part in the form of a charging plug on a cable connected to a charging station, in order in this way to establish an electrical connection between the charging station and the vehicle.

In particular in the case of charging sockets, also referred to as inlets, to be arranged on the part of a vehicle, it is usually provided to design a housing part visible from the outside for different vehicles differently according to the wishes of a vehicle manufacturer. However, a connector part that forms the plug section with electrical contact elements arranged thereon is usually standardized in this case with a view toward its plug face. Given that housing parts are designed differently for different vehicles, it is difficult with previous approaches to use common parts to form the plug connector part, because the connector part usually also has to be adapted for fastening to the housing part (variable depending on the vehicle).

Conventionally, it has been provided to connect such a connector part to the housing part by attaching screws. This requires additional assembly steps and thus makes the assembly process more difficult. Thus, it is desirable to have a plug connector part, with which a connector part can be connected to a housing part in a simple, easy to assemble manner.

Conventionally, it has also been provided that a cover element—which can be designed, for example, as a spout and serves for in particular rear-side sealing of the plug connector part, where an electrical line is guided to the connector part—is connected to the connector part by means of a clamp to be screwed and thus clamped to the connector part. This further complicates the assembly process of the plug connector part.

In a plug connector part known from DE 10 2014 215 077 A1 in the form of a charging socket, a tongue-and-groove connection is provided for arranging the charging socket on a holding device.

DE 10 2012 019 605 A1 discloses a module system for creating a plurality of variants of a charging device. In this module system, a charging socket can, for example, be connected to a charging socket holder via a mounting flange via screw connections.

WO 2018/091422 A1 discloses a plug connector part that has a housing with a plug opening formed therein for inserting a mating plug connector part and a base part that can be connected to the housing part. The base part can be connected to the housing part via a connection in the manner of a bayonet closure, wherein the connection can be fixed via a locking frame.

SUMMARY

In an embodiment, the present invention provides a plug connector part for connecting to a mating plug connector part, comprising: a housing part; a connector part that is to be locked to the housing part and has a plug section on which at least one contact element is arranged for a plug connection to the mating plug connector part; a cover element that is to be connected to the connector part and has at least one line outlet for receiving an electrical line connected to the connector part; and a frame part, which is to be connected in a latching manner to the connector part and is formed to fasten the cover element to the connector part when the frame part is placed on the connector part.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 a view of a charging station with a cable arranged thereon;

FIG. 2 a view of a plug connector part in the form of a charging socket to be attached to a vehicle;

FIG. 3 a view of an exemplary embodiment of a plug connector part with a housing part, a connector part and a frame part serving to fasten a cover element to the connector part;

FIG. 6 a view of the housing part and the connector part before the frame part is attached;

FIG. 7 a front view of the plug connector part;

FIG. 8A a sectional view along line A-A according to FIG. 7;

FIG. 8B an enlarged view of the detail A1 according to FIG. 8A;

DETAILED DESCRIPTION

Figure 4:
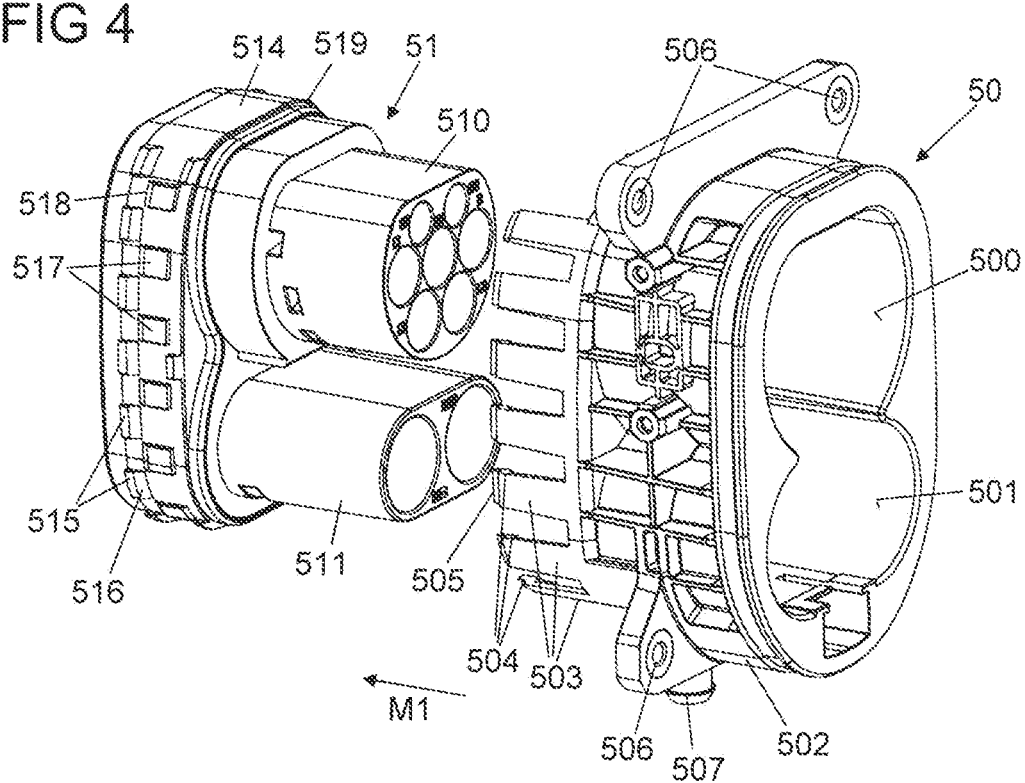
FIG. 4 a view of the housing part and the connector part before attachment to one another.

In an embodiment, the present invention provides a plug connector part and a method for mounting a plug connector part that enable simple assembly with fastening of a cover element to the connector part.

Accordingly, the plug connector part has a frame part that is to be connected in a latching manner to the connector part and is formed to fasten the cover element to the connector part when the frame part is placed on the connector part.

The plug connector part is thus formed in several parts with components to be connected modularly. The connector part, which forms a plug face via the plug section formed thereon and electrical contact elements arranged thereon, can be connected in a latching manner to the housing part, which forms a so-called variance region for arranging the plug connector part, for example, on a vehicle. While the connector part can be formed as a common part for use on different plug connector parts and is standardized on its plug face, for example, according to a standard for a charging system, the housing part is variable and dependent on, for example, a vehicle type on which the plug connector part is to be used, for example, as a charging socket. The modular design of the connector part in interaction with the housing part, which is variable according to customer preference, thus enables the use of common parts for the connector part.

The frame part is also of modular design and is to be connected in a latching manner to the connector part. In this case, the frame part serves to fix a cover element, which serves for sealing the connector part in a region in which one or more electrical lines are arranged on the connector part, to the connector part. The cover element is fixed to the connector part by simple latching of the frame part to the connector part without having to take further measures, in particular for producing a screw connection or the like. The mounting and arrangement of the cover element can thus be accomplished easily and comfortably.

Given that both the housing part and the frame part are to be locked to the connector part, screw connections for connecting the individual parts to one another can be dispensed with, thereby making the assembly of the plug connector part simple overall.

The cover element is formed, for example, as a sleeve made of a soft material, for example a rubber material, and is preferably flexibly deformable in this case. Alternatively, the cover element can, for example, take the form of a rigid cover, on the edge of which that faces the connector part, a seal, for example, can be attached or molded (by means of injection molding).

The cover element is placed, for example, on the connector part with an edge section and is held on the connector part via the frame part when the frame part is placed on the connector part. With its edge section, the cover element can be in contact with the connector part here in such a way that a transition between the connector part and the cover element is sealed in a moisture-tight manner, and moisture therefore cannot reach a region in which one or more electrical lines are arranged on the connector part. The one or more electrical lines are guided out of the cover element via one or more line outlets, wherein a transition between the cover element and the electrical lines is advantageously sealed in a moisture-tight manner.

In one embodiment, the housing part has at least one first latching element and the connector part has at least one first mating latching element. The at least one first latching element and the at least one first mating latching element can be brought into engagement with one another along a (first) mounting direction for connecting the connector part to the housing part, so that the connector part and the housing part are latched together in a positive-locking manner via the at least one first latching element and the at least one first mating latching element.

The at least one first latching element and/or the at least one first mating latching element can in this case be elastically deflected at least over a certain deflection path, so that when the housing part and the connector part are attached to each other, the at least one first latching element and/or the at least one first mating latching element can be elastically deflected, and the at least one first latching element and the at least one first mating latching element can thus engage with each other in a positive-locking manner.

For example, the at least one first mating latching element can be formed as a rigid latching projection on the connector part. In this case, the at least one first mating latching element has, for example, a run-up slope that enables the at least one first latching element of the housing part to run up along the (first) mounting direction onto the at least one first mating latching element when the housing part and the connector part are attached to one another, in order to produce the positive lock between the housing part and the connector part.

In one embodiment, the housing part has a housing body, wherein the at least one first latching element is formed as a latching finger extending along the (first) mounting direction of the housing body. One or more first latching elements thus project as latching fingers from the housing body of the housing part and can be deflected elastically preferably transversely to the (first) mounting direction, so that a positive-locking latching connection can be established between the connector part and the housing part when the housing part and the connector part are attached to one another.

In particular, in an embodiment in which it is provided that the housing part and the connector part are first connected to one another and the frame part is then placed on the connector part, it can be provided that the frame part, in addition to fastening the cover element to the connector part, serves to secure the latching connection between the connector part and the housing part by the frame part acting on the at least one first latching element of the housing part when the frame part is placed on the connector part and locking it in its connection with the associated at least one first mating latching element of the connector part. If the frame part is placed on the connector part, a connection between the connector part and the housing part cannot thus be easily released, at least not without removing the frame part and subsequently releasing the latching connection between the housing part and the connector part.

For this purpose, the frame part can act, for example, on an engaging element formed on the at least one first latching element in the manner of a tab, in order to lock the at least one first latching element in its position where it is latched to the at least one first mating latching element. The frame part can, for example, engage around the engaging element and thus hold the engaging element in position, so that a deflection of the at least one first latching element is prevented.

In one embodiment, the frame part has at least one second latching element and the connector part has at least one second mating latching element. The at least one second latching element of the frame part and the at least one second mating latching element of the connector part can be brought into latching engagement with one another along a (second) mounting direction, in order to produce a positive lock in this way between the frame part and the connector part. The frame part can thus also be connected in a latching manner to the connector part in which latching elements engage in a latching manner with associated mating latching elements.

Assembly is generally carried out along an axis, wherein the first mounting direction and the second mounting direction are aligned along the axis. The second mounting direction can be opposite the first mounting direction, but can also be of the same orientation as the first mounting direction.

The at least one second latching element of the frame part and/or the at least one mating latching element of the connector part can be elastically deflectable over a certain adjustment path, in order to enable a latching connection when the frame part and the connector part are attached to one another. For example, the at least one second latching element of the frame part can be formed to be elastically resilient, while the at least one second mating latching element of the connector part is designed as a rigid latching projection. In this case, the at least one second mating latching element has, for example, a run-up slope that allows the at least one second latching element to run up onto the mating latching element for establishing a positive-locking connection when the frame part and the connector part are attached to one another.

In one embodiment, the frame part has a frame body. In this case, the at least one second latching element of the frame part is formed, for example, as a latching finger that extends from the frame body along the (second) mounting direction and thus projects from the frame body. In this case, the at least one second latching element is preferably designed to be elastically resilient and can be elastically deflected with respect to one another when the frame part and the connector part are attached, in order to be pushed aside when attached and to produce a snap-fit, positive-locking connection with the connector part.

In particular, in an embodiment in which the frame part is first placed on the connector part for fastening the cover element and then the housing part is to be connected to the connector part, it can be provided that the housing part is formed to act on the at least one second latching element of the frame part, in order to lock the latching connection between the connector part and the frame part against releasing. In this case, the connection between the frame part and the connector part is thus secured via the housing part by the housing part acting on the at least one second latching element and holding it in its positive-locking engagement with the associated at least one second mating latching element of the connector part. For this purpose, the housing part can engage around the at least one second latching element, for example, in such a way that a deflection of the at least one second latching element for releasing the positive-locking connection is prevented.

In one embodiment, the housing part has a plurality of first latching elements and the frame part has a plurality of second latching elements, each of which can be designed as latching fingers and thus projects on the one hand from the housing body of the housing part and on the other hand from the frame body of the frame part. In a mounted position of the plug connector part, in which the housing part, the connector part and the frame part are connected to one another, a first latching element of the housing part can be received between two second latching elements of the frame part and/or a second latching element of the frame part can be received between two first latching elements of the housing part. The first latching elements and the second latching elements can each be arranged in a manner distributed circumferentially about the axis of the mounting direction on the housing body, on the one hand, and on the frame body, on the other hand, and thereby form a comb structure, wherein, in the mounted position of the plug connector part, the latching elements engage one another in such a way that a first latching element respectively comes to rest between two second latching elements and a second latching element respectively comes to rest between two first latching elements.

In one embodiment, the connector part has a housing part on which a plurality of first mating latching elements for latching connection to the first latching elements of the housing part and a plurality of second mating latching elements for latching connection to the second latching elements of the frame part are arranged. In this case, the first mating latching elements and the second mating latching elements can be alternately arranged with respect to one another about the axis of the mounting direction when viewed along a circumferential direction. The first mating latching elements and the second mating latching elements are thus arranged on the housing of the connector part in such a way that a second mating latching element follows a first mating latching element and a first mating latching element follows it in turn.

In one embodiment, the plug connector part has a sealing element that is arranged, for example, between the connector part and the housing part and acts between the connector part and the housing part (when the connector part and the housing part are attached to each other), in order to seal a transition between the connector part and the housing part in a moisture-tight manner. Via the sealing element, an elastic pre-stressing can also exist between the housing part and the connector part, which causes the first latching elements of the housing part and the first mating latching elements of the connector part to be held in engagement with one another without play.

Since, in one embodiment, the cover element comes to rest with an edge section between the frame part and the connector part and is made of a flexible, elastic material, for example a rubber material, a transition between the cover element and the connector part is also sealed in a moisture-tight manner, wherein an elastic pre-stressing between the frame part and the connector part can be effected via the edge section and holds the second latching elements of the frame part and the second mating latching elements of the connector part in engagement with one another without play. The connection between the frame part and the connector part is thus also made free of play.

The object is also achieved by a method for mounting a plug connector part for connecting to a mating plug connector part, in which a connector part, which comprises a plug section on which at least one contact element is arranged for a plug connection to the mating plug connector part, is latched to a housing part, and a cover element, which has at least one line outlet for receiving an electrical line connected to the connector part, is connected to the connector part. In this case, it is provided that a frame part is connected in a latching manner to the connector part, wherein the frame part fastens the cover element to the connector part when the frame part is placed on the connector part.

In this case, it can be provided that the connector part is first latched to the housing part and the frame part is then connected to the connector part. Alternatively, however, it can also be provided that the frame part is first connected to the connector part and then the connector part is latched to the housing part.

Regarding advantages and advantageous embodiments, reference should otherwise be made to the explanation provided above regarding the plug connector part, which is also analogously applicable to the method.

FIG. 1 shows a charging station 1 that serves for charging an electrically powered vehicle 4, also referred to as an electric vehicle. The charging station 1 is designed to provide a charging current in the form of an alternating current or a direct current and has a cable 2 that is connected at one end 201 to the charging station 1 and at another end 200 to a mating plug connector part 3 in the form of a charging plug.

The mating plug connector part 3 can be engaged in a plug-in manner with an associated connector part 5 in the form of a charging socket on the vehicle 4. In this way, the charging station 1 can be electrically connected to the vehicle 4, in order to transfer charging currents from the charging station 1 to the vehicle 4.

FIG. 2 shows an exemplary embodiment of a connector part 5 in the form of a charging socket to be arranged, for example, on a vehicle 4. The plug connector part 5 in the form of the charging socket has a housing part 50, which is to be fastened to an associated vehicle via fastening points 506 and on which is arranged a connector part 51 for forming a plug face. The connector part 51 forms plug sections 510, 511 that are arranged along a plug-in direction E (see FIG. 1) and can be connected in a plug-in manner to an associated mating plug connector part 3, in order to electrically contact electrical contacts 512, 513 at the plug sections 510, 511 with the mating plug connector part 3 and thereby establish an electrical connection between the charging station 1 and the vehicle 4.

In the exemplary embodiment shown, electrical contact elements 512 are arranged on an upper, first plug section 510 and can serve in particular for transmitting a charging current in the form of an alternating (optionally multi-phase) current. In contrast, contact elements 513, via which a charging current in the form of a direct current can be transmitted to the vehicle 4, are arranged on a lower, second plug section 511. In addition to load contacts for transferring a charging current, signal contacts for transferring control signals can also be provided at the plug sections 510, 511.

In the case of a connector part 5 in the form of a charging socket to be arranged on a vehicle 4, as shown by way of example in FIG. 2, the housing part 50 is usually variable in shape for different vehicles. In contrast, the plug face provided by the connector part 51 is standardized, so that the connector part 5 can be brought into engagement with a correspondingly standardized, complementary charging plug 3 for charging the vehicle 4.

In order to assemble the plug connector part 5, the connector part 51 must be fastened to the housing part 50, wherein it is desirable to use a predefined interface for connection, so that a common part can be used for the connector part 51 and can be connected to differently designed housing parts 50. This makes it possible to use a uniform connector part 51 on quite different housing parts 50, which reduces the variety of parts and also reduces the effort and costs in designing a plug connector part 5, because adaptations to the connector part 51 are no longer necessary.

FIGS. 3 to 9A, 9B show an exemplary embodiment of a plug connector part 5. In the exemplary embodiment shown, the plug connector part 5 has a housing part 50 that is to be connected in a latching manner to a connector part 51 in such a way that plug sections 510, 511 of the connector part 51 come to rest in associated receiving openings 500, 501 on the front side 508 of the housing part 50 and thus form a plug face on the front side 508 for a plug connection with an associated mating plug connector part 3.

A cover element 53 is arranged on the connector part 51, which cover element serves to enclose electrical lines 54 on the connector part 51 in a moisture-tight manner and for this purpose is held on the connector part 51 via a frame part 52. The cover element 53 has a spout body 530 made of an elastically deformable material, at which line outlets 531 for receiving electrical lines 54 are formed, so that the electrical lines 54 are inserted into the cover element 53 and enclosed on the connector part 51 in a moisture-tight manner, as shown in particular in FIG. 3.

In order to assemble the plug connector part 5, the housing part 50, the connector part 51 and the frame part 52 are connected in a latching manner to one another by attaching the housing part 50, the connector part 51 and the frame part 52 to one another. In this case, the frame part 52 surrounds an edge section 532 of the cover element 53 with a frame body 520 (see FIG. 6 in conjunction with FIGS. 8B and 9B), so that the cover element 53 is fixed to the connector part 51 via the frame part 52.

Figure 5:
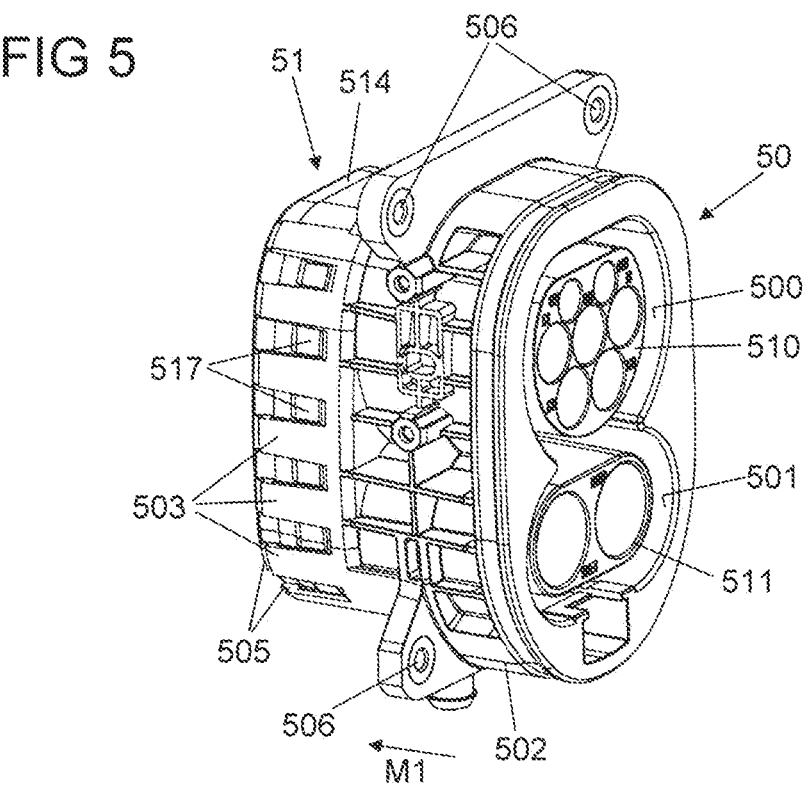
FIG. 5 a view of the housing part and the connector part in an attached position.

In the exemplary embodiment shown, the housing part 50 is first connected in a latching manner to the connector part 51, as shown in FIGS. 4 and 5. The housing part 50 has a housing body 502 from which latching elements 503 extend axially along a first mounting direction M1 in the manner of latching fingers, which serve to latch with associated first mating latching elements 515 on a housing 514 of the connector part 51, in order to fasten the housing part 50 and the connector part 51 to one another. A plurality of first latching elements 503 are formed in a manner circumferentially distributed around the first mounting direction M1 on the housing body 502, wherein each latching element 503 has a latching head 504 for latching with a respectively associated mating latching element 515 and an engaging element 505 projecting from the latching head 504.

To connect the housing part 50 to the connector part 51, the housing part 50 is attached to the connector part 51 in the mounting direction M1, so that the latching elements 503 of the housing part 50 with their latching heads 504 run onto run-up slopes 516 on the mating latching elements 515 of the connector part 51 and thus engage in a latching manner with the mating latching elements 515, as shown in the transition from FIG. 4 to FIG. 5.

In the exemplary embodiment shown, after connecting the housing part 50 to the connector part 51, the cover element 53 is attached to a side of the connector part 51 facing away from the housing part 50, as shown in FIG. 6, and the frame part 52 is arranged on the connector part 51, for example, in a second mounting direction M2 opposite the first mounting direction M1. The frame part 52 has second latching elements 521 that project axially along the mounting direction M2 from a closed frame body 520 extending circumferentially around the mounting direction M2 and are formed in the manner of latching fingers with latching heads 522 formed on the latching elements 521.

When the frame part 52 is attached to the connector part 51, the latching elements 521 with their latching heads 522 run onto run-up slopes 518 on assigned second mating latching elements 517 of the connector part 51. In the connected position, the latching elements 521 with their latching heads 522 are latched in a positive-locking manner to the associated mating latching elements 517 on the housing 514 of the connector part 51, so that the frame part 52 is connected to the connector part 51 and the cover element 53 is thereby fastened to the connector part 51.

In the mounted position of the plug connector part 5 shown in FIG. 3, the latching elements 503 of the housing part 50 and the latching elements 521 of the frame part 52 engage each other alternately, so that a latching element 521 of the frame part 52 comes to rest between two latching elements 503 of the housing part 50 and vice versa.

The first mating latching elements 515 and the second mating latching elements 517 are each formed as rigid latching projections on the connector part 51 projecting radially from the housing 514. The first mating latching elements 515 and the second mating latching elements 517 are arranged here alternately relative to one another in such a way that a second mating latching element 517 follows a first mating latching element 515 and vice versa, as shown in particular in FIG. 4.

As shown in the sectional view according to FIG. 8A and in the enlarged detail view according to FIG. 8B, each latching element 503 of the housing part 50 in the mounted position of the plug connector part 5 engages in a positive-locking manner with an associated mating latching element 515 of the connector part 51. A sealing element 519 (which extends on the connector part 51 before connecting the housing part 50 to the connector part 51, as shown in FIG. 4) is arranged here between the housing part 50 and the connector part 51 and seals a transition between the housing part 50 and the connector part 51 in a moisture-tight manner and also brings about an elastic pretensioning axially along the mounting direction M1, which results in the latching elements 503 and the mating latching elements 515 being held in engagement with one another under elastic axial pretensioning and thus free of play along the mounting direction M1.

Figure 9A:
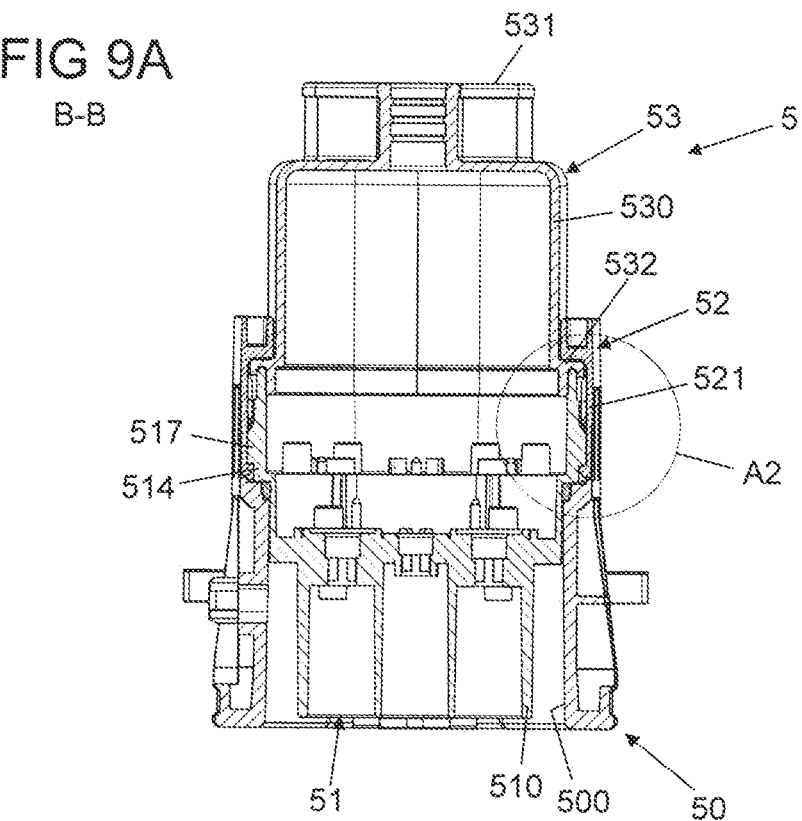
FIG. 9A a sectional view along line B-B according to FIG. 7.
Figure 9B:
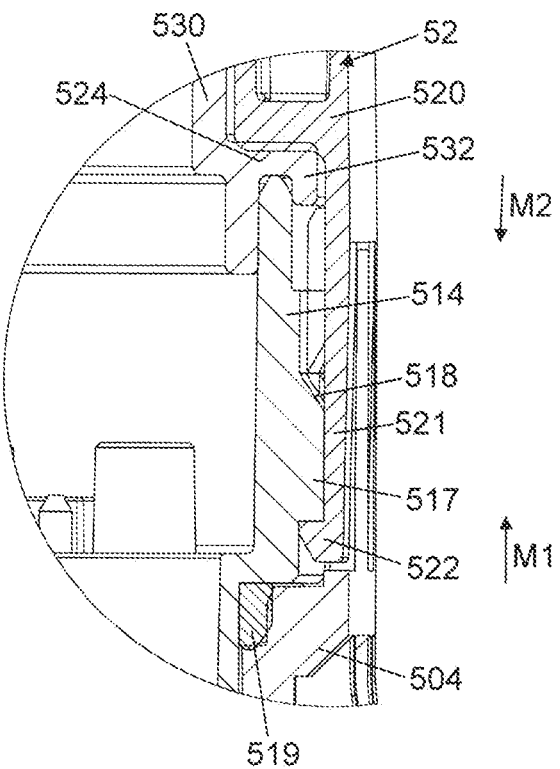
FIG. 9B an enlarged view of the detail A2 according to FIG. 9A.

As shown in the sectional view according to FIG. 9A and the enlarged detail view according to FIG. 9B, each latching element 521 of the frame part 52 engages in a positive-locking manner with an associated mating latching element 517 of the connector part 51 in the mounted position of the plug connector part 5. The edge section 532 of the cover element 53 comes to rest between a circumferential contact contour 524 formed inside the frame part 52 and the housing 514 of the connector part 51, as shown in FIG. 9B. The transition between the cover element 53 and the connector part 51 is thereby sealed, wherein the edge section 532 additionally brings about an elastic pretension between the frame part 52 and the connector part 51, which results in the latching elements 521 and the mating latching elements 517 being held in engagement with one another without play along the mounting direction M2.

The frame part 52 serves to fix the cover element 53 to the connector part 51, wherein a clamping effect is effected on the edge section 532 via the contact contour 524 for a moisture-tight seal at the transition to the connector part 51. In this case, the frame part 52 is additionally formed to lock the latching between the housing part 50 and the connector part 51 by the frame part 52 engaging with its frame body 520, in particular with edge sections 523 formed between the latching elements 521, around the engaging elements 505 on the latching elements 503 of the housing part 50, as shown in FIG. 8B. The latching elements 503 are thus secured in their engagement with the associated mating latching elements 515 of the connector part 51, so that the connection between the housing part 50 and the connector part 51 cannot be easily released, in any case not without releasing the frame part 52.

The idea underlying the invention is not limited to the exemplary embodiments described above, but can also be realized in a completely different manner.

A plug connector part of the described type can be implemented as a charging socket on an electric vehicle, but can also, for example, form a charging plug connected to a charging station via a charging cable.

In addition, such a plug connector part can also be used to charge an electric vehicle independently of a charging system.

Load currents in the form of direct current or in the form of alternating current can be transmitted via such a plug connector part.

The connector part and the housing part of the plug connector part can be of quite different designs. In this respect, the connector part and the housing part are in particular not limited to the specifically shown embodiments.

In the exemplary embodiment shown, the frame part serves (also) to lock the latching connection between the housing part and the connector part. Conversely, it is also conceivable and possible, in particular in an embodiment in which the frame part is first connected to the connector part and the housing part is then attached, to configure the housing part for this purpose to lock the latching connection between the connector part and the frame part by the housing part surrounding latching elements of the frame part and thus holding them in engagement with associated mating latching elements of the connector part.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Charging station
2 Charging cable
200, 201 End
3 Mating plug connector part (charging plug)
4 Vehicle 5 Plug connector part (charging socket)
50 Housing part
500, 501 Receiving opening
502 Housing body
503 Latching element
504 Latching head
505 Engagement element
506 Fastening element
507 Terminal connection
508 Front side
51 Connector part
510, 511 Plug section
512, 513 Contact element
514 Housing
515 Mating latching element
516 Run-up slope
517 Mating latching element
518 Run-up slope
519 Sealing element
52 Frame part
520 Frame body
521 Latching element
522 Latching head
523 Edge section
524 Contact contour
53 Cover element
530 Spout body
531 Line outlet
532 Edge section
54 Line
E Insertion direction
M1, M2 Mounting direction

The invention claimed is:

1. A plug connector part for connecting to a mating plug connector part, comprising:
 a housing part;
 a connector part that is to be locked to the housing part and has a plug section on which at least one contact element is arranged for a plug connection to the mating plug connector part;
 a cover element that is to be connected to the connector part and has at least one line outlet for receiving an electrical line connected to the connector part; and
 a frame part, which is to be connected in a latching manner to the connector part and is formed to fasten the cover element to the connector part when the frame part is placed on the connector part,
 wherein the housing part has at least one first latching element and the connector part has at least one first mating latching element,
 wherein the at least one first latching element and the at least one first mating latching element are engageable with one another along a mounting direction to connect the connector part to the housing part,
 wherein the housing part has a housing body, and
 wherein the at least one first latching element is formed as a latching finger extending along the mounting direction from the housing body.

2. The plug connector part of claim 1, wherein, when the frame part is placed on the connector part, an edge section of the cover element bears against the connector part and is held on the connector part via the frame part.

3. The plug connector part of claim 1, wherein the at least one first mating latching element has a run-up slope for the at least one first latching element of the housing part for running up along the mounting direction.

4. The plug connector part of claim 1, wherein the frame part is formed to act on the at least one first latching element of the housing part, in order to lock the latching connection between the housing part and the connector part against releasing.

5. The plug connector part of claim 1, wherein the frame part has at least one second latching element and the connector part has at least one second mating latching element, and
 wherein the at least one second latching element and the at least one second mating latching element can be brought into latching engagement with one another along a mounting direction to connect the frame part to the connector part.

6. The plug connector part of claim 5, wherein the at least one second mating latching element has a run-up slope for the at least one second latching element of the frame part for run-up along the mounting direction.

7. The plug connector part of claim 5, wherein the frame part has a frame body, and
 wherein the at least one second latching element is formed as a latching finger extending along the mounting direction from the frame body.

8. The plug connector part of claim 5, wherein the housing part is formed to act on the at least one second latching element of the frame part, in order to lock the latching connection between the connector part and the frame part against releasing.

9. The plug connector part of claim 1, wherein the housing part has a plurality of first latching elements and the frame part has a plurality of second latching elements, and
 wherein, in a mounted position the plug connector part, in which the housing part, the connector part, and the frame part are connected to one another, a first latching element is received between two second latching elements and/or a second latching element is received between two first latching elements.

10. The plug connector part of claim 1, wherein the connector part has a housing on which first mating latching elements for latching connection to the housing part and second mating latching elements for latching connection to the frame part are arranged alternately between one another along a circumferential direction.

11. The plug connector part of claim 1, further comprising:
 a sealing element that seals a transition between the housing part and the connector part in a moisture-tight manner when the connector part is latched to the housing part.

12. A method for mounting a plug connector part for connecting to a mating plug connector part, comprising:
 locking a connector part, which has a plug section on which at least one contact element is arranged for a plug connection to the mating plug connector part, to a housing part; and
 connecting a cover element, which has at least one line outlet for receiving an electrical line connected to the connector part, to the connector part,
 wherein a frame part is connected in a latching manner to the connector part,
 wherein the frame part fastens the cover element to the connector part when the frame part is placed on the connector part,
 wherein the housing part has at least one first latching element and the connector part has at least one first mating latching element, wherein the at least one first latching element and the at least one first mating latching element are engageable with one another along a mounting direction to connect the connector part to the housing part, wherein the housing part has a housing body, and wherein the at least one first latching element is formed as a latching finger extending along the mounting direction from the housing body.

13. The method of claim 12, wherein first the connector part is latched to the housing part and then the frame part is connected to the connector part, or first the frame part is connected to the connector part and then the connector part is latched to the housing part.

* * * * *